(12) United States Patent
Alstad

(10) Patent No.: US 10,157,236 B2
(45) Date of Patent: Dec. 18, 2018

(54) OPTIMIZED RENDERING OF DYNAMIC CONTENT

(75) Inventor: Kent Alstad, Sechelt (CA)

(73) Assignee: Radware, Ltd., Tel Aviv (IL)

( * ) Notice: Subject to any disclaimer, the term of this patent is extended or adjusted under 35 U.S.C. 154(b) by 686 days.

(21) Appl. No.: 13/475,263

(22) Filed: May 18, 2012

(65) Prior Publication Data

US 2012/0303697 A1    Nov. 29, 2012

Related U.S. Application Data

(60) Provisional application No. 61/488,892, filed on May 23, 2011.

(51) Int. Cl.
*G06F 17/30*    (2006.01)

(52) U.S. Cl.
CPC .... *G06F 17/3089* (2013.01); *G06F 17/30902* (2013.01)

(58) Field of Classification Search
CPC .................................................. G06F 17/30902
USPC ....................................................... 709/203
See application file for complete search history.

(56) References Cited

U.S. PATENT DOCUMENTS

| | | | |
|---|---|---|---|
| 5,564,070 A | 10/1996 | Want | |
| 5,784,562 A | 7/1998 | Diener | |
| 6,038,601 A | 3/2000 | Lambert | |
| 6,286,043 B1 * | 9/2001 | Cuomo | H04L 67/30 709/217 |
| 6,370,687 B1 | 4/2002 | Shimura | |
| 6,385,641 B1 | 5/2002 | Jiang et al. | |
| 6,457,103 B1 | 9/2002 | Challenger et al. | |
| 6,604,143 B1 | 8/2003 | Nager | |
| 6,618,751 B1 | 9/2003 | Challenger | |
| 6,839,741 B1 | 1/2005 | Tsai | |
| 7,043,460 B2 | 5/2006 | Deboer et al. | |
| 7,096,418 B1 | 8/2006 | Singhal et al. | |
| 7,139,780 B2 | 11/2006 | Lee et al. | |
| 7,194,522 B1 | 3/2007 | Swildens et al. | |
| 7,266,595 B1 | 9/2007 | Black et al. | |

(Continued)

FOREIGN PATENT DOCUMENTS

| | | |
|---|---|---|
| NZ | 566291 | 2/2008 |
| WO | 0178334 | 10/2001 |
| WO | 0186494 | 11/2001 |

OTHER PUBLICATIONS

Jung, Gueyoung, et al. "Generating Adaptation Policies for Multi-Tier Applications in Consolidated Server Environments", in Proceedings of the 5th IEEE International Conference on Automonic Computing, Jun. 2-6, 2008, pp. 23-32.

(Continued)

*Primary Examiner* — Kevin S Mai

(74) *Attorney, Agent, or Firm* — M&B IP Analysts, LLC

(57) ABSTRACT

In a client/server environment, rendering of web-based content is separated into two phases, so as to improve the applicability of HTML response caching. Static portion(s) of a web page are cached and delivered immediately in response to an HTTP request, concurrently with sending a request for a full page and extracting dynamic portion(s) therefrom. Dynamic portion(s) are filled in at the client as they become available. The system and method of the present invention enable optimization of the user experience to occur without requiring any recoding of the original page content.

2 Claims, 13 Drawing Sheets

(56) References Cited

U.S. PATENT DOCUMENTS

| | | |
|---|---|---|
| 7,295,953 B2 | 11/2007 | Cox et al. |
| 7,392,294 B2 | 6/2008 | Hellstrom |
| 7,398,304 B2 | 7/2008 | Smith et al. |
| 7,469,280 B2 | 12/2008 | Simpson |
| 7,711,854 B2 | 5/2010 | Ecklund et al. |
| 7,865,585 B2 | 1/2011 | Samuels et al. |
| 7,886,218 B2 | 2/2011 | Watson |
| 7,895,256 B2 | 2/2011 | Zombek et al. |
| 8,001,175 B2 | 8/2011 | Betancourt et al. |
| 2002/0065899 A1 | 5/2002 | Smith et al. |
| 2002/0156881 A1 | 10/2002 | Klopp Lemon et al. |
| 2003/0004937 A1 | 1/2003 | Salmenkaita et al. |
| 2003/0004998 A1 | 1/2003 | Datta |
| 2003/0040995 A1 | 2/2003 | Daddario et al. |
| 2003/0065810 A1 | 4/2003 | Ims et al. |
| 2003/0078964 A1 | 4/2003 | Parrella, Sr. et al. |
| 2003/0191812 A1 | 10/2003 | Agarwalla et al. |
| 2003/0204769 A1 | 10/2003 | Coughlin |
| 2003/0225897 A1 | 12/2003 | Krawetz |
| 2004/0043758 A1 | 3/2004 | Sorvari et al. |
| 2004/0117438 A1 | 6/2004 | Considine |
| 2004/0205165 A1 | 10/2004 | Melamed et al. |
| 2004/0236824 A1 | 11/2004 | Millington et al. |
| 2004/0268357 A1 | 12/2004 | Joy |
| 2005/0033855 A1 | 2/2005 | Moradi et al. |
| 2005/0108335 A1 | 5/2005 | Naick et al. |
| 2005/0138033 A1 | 6/2005 | Katta |
| 2005/0177866 A1* | 8/2005 | Kirsch ............................. 726/3 |
| 2005/0188048 A1 | 8/2005 | Yuan et al. |
| 2005/0210243 A1 | 9/2005 | Archard |
| 2005/0261985 A1 | 11/2005 | Miller et al. |
| 2006/0015512 A1 | 1/2006 | Alon et al. |
| 2006/0095527 A1 | 5/2006 | Malik |
| 2006/0143290 A1 | 6/2006 | Dostert et al. |
| 2006/0212149 A1 | 9/2006 | Hicken et al. |
| 2006/0212601 A1 | 9/2006 | Hampton |
| 2006/0224723 A1 | 10/2006 | Chen |
| 2006/0225065 A1 | 10/2006 | Chandhok et al. |
| 2006/0235941 A1 | 10/2006 | Areas et al. |
| 2007/0005603 A1 | 1/2007 | Jain et al. |
| 2007/0174644 A1 | 7/2007 | Willig |
| 2007/0180035 A1 | 8/2007 | Liu et al. |
| 2007/0260748 A1 | 11/2007 | Talkington |
| 2007/0268865 A1 | 11/2007 | Garcia et al. |
| 2007/0291741 A1 | 12/2007 | Hwang |
| 2008/0008109 A1 | 1/2008 | Ollis |
| 2008/0016240 A1 | 1/2008 | Balandin |
| 2008/0208789 A1 | 8/2008 | Almog |
| 2008/0208961 A1 | 8/2008 | Kim |
| 2009/0132658 A1 | 5/2009 | Glickstein |
| 2009/0254707 A1 | 10/2009 | Alstad |
| 2009/0270076 A1 | 10/2009 | Zhou et al. |
| 2009/0276488 A1 | 11/2009 | Alstad |
| 2011/0295979 A1 | 12/2011 | Alstad et al. |
| 2012/0066586 A1* | 3/2012 | Shemesh ...................... 715/235 |

OTHER PUBLICATIONS

"Optimize caching". Retrieved from: http://code.google.com/speed/page-speed/docs/caching.html.

"Seam Framework—HTTP client-server optimization strategies". Retrieved from: http://seamframework.org/Documentation/HTTPClientserverOptimizationStrategies.

Xue Liu et al., "On-line Response Time Optimization of Apache Web Server", Proceedings of the 11th international conference on Quality of service, 2003, Springer-Verlag, pp. 461-478.

International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IB2012/052525; dated Nov. 26, 2013.

* cited by examiner

Configure Dynamic Content Selector – Overview

Automatically Configure Dynamic Content Selector - Details

Request Non-Cached Page – Overview

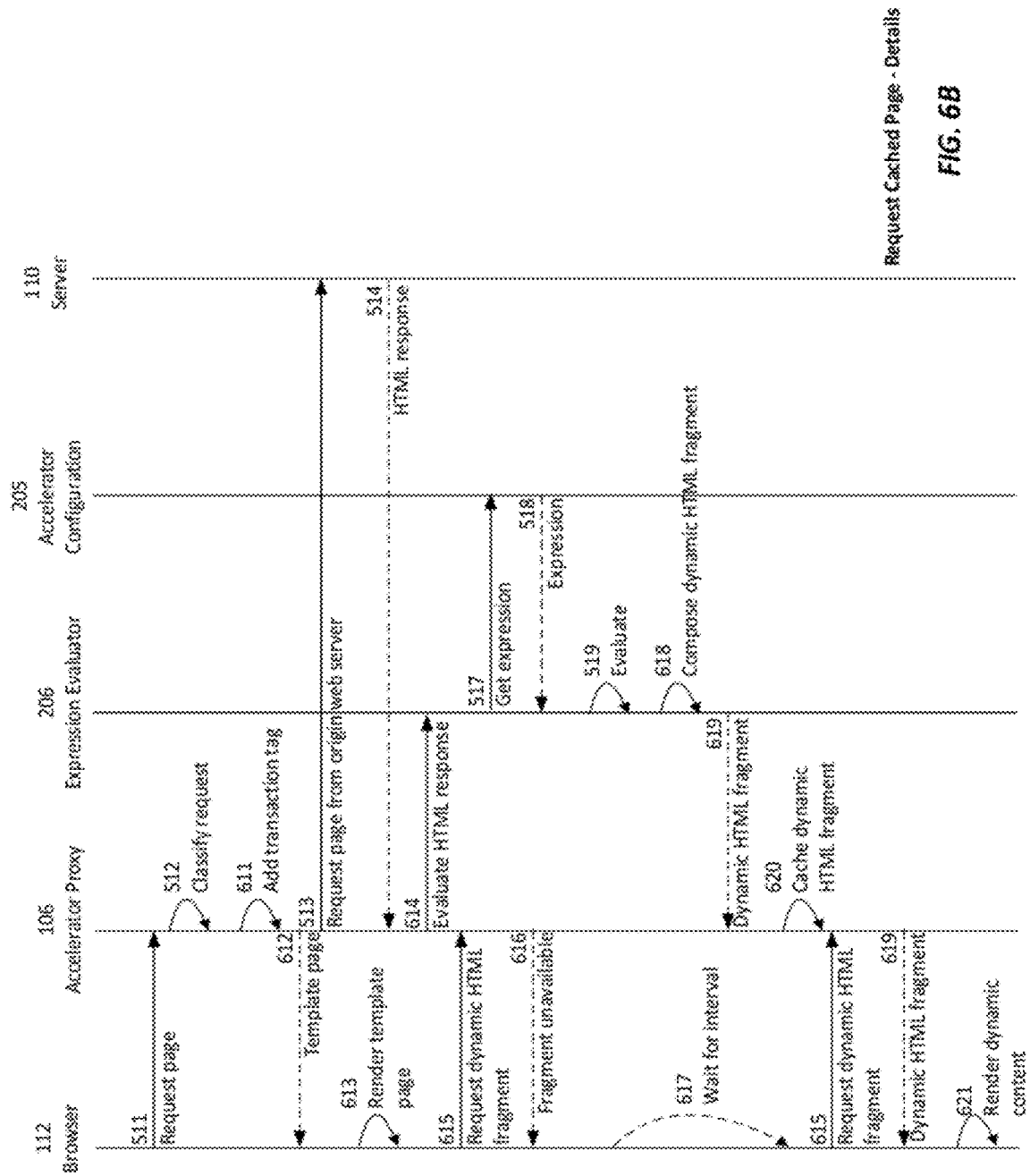

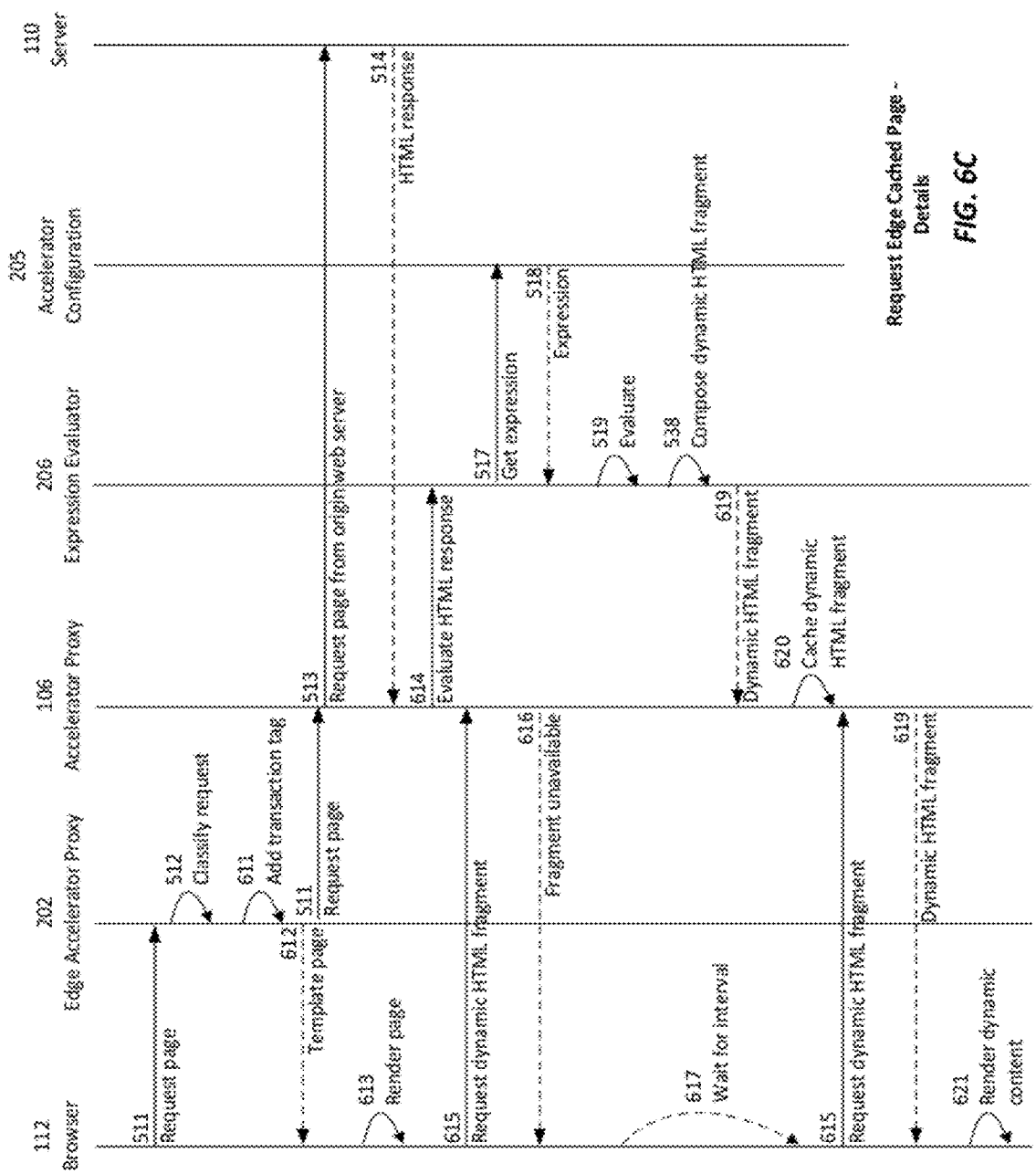

OPTIMIZED RENDERING OF DYNAMIC CONTENT

CROSS-REFERENCE TO RELATED APPLICATION

The present application claims priority from U.S. Provisional Application Ser. No. 61/488,892 for "Optimizing the Rendering of Dynamic Content in HTML Pages," filed May 23, 2011, the disclosure of which is incorporated herein by reference.

The present application is related to U.S. Utility application Ser. No. 12/187,233 for "Partial Content Caching," filed Aug. 6, 2008, the disclosure of which is incorporated herein by reference.

The present application is related to U.S. Utility application Ser. No. 12/426,909 for "Extensible, Asynchronous, Centralized Analysis and Optimization of Server Responses to Client Requests," filed Apr. 20, 2009, the disclosure of which is incorporated herein by reference.

The present application is related to U.S. Utility application Ser. No. 13/110,524 for "Accelerating HTTP Responses in a Client/Server Environment," filed May 18, 2011, the disclosure of which is incorporated herein by reference.

The present application is related to U.S. Utility application Ser. No. 13/357,624 for "Image Optimization," filed Jan. 25, 2012, the disclosure of which is incorporated herein by reference.

FIELD OF THE INVENTION

The present invention relates to mechanisms for optimizing the rendering of dynamic content, for example when presenting web pages in a client/server environment.

BACKGROUND

The usability and popularity of a web page are often directly related to the time required to render the page in the user's browser. In many instances, even slight improvements in the speed of client-side rendering of a web page can have dramatic positive effects on the likelihood that the user will visit the page again and on the likelihood that commercial inquiries will be converted into sales.

One method of improving web page performance is by caching content on servers or proxies in an effort to speed responses to HTTP requests. However, content that is frequently updated or that is personalized for each user (referred to herein as "dynamic content") is not amenable to caching, except for very brief intervals. In many cases, the majority of a page's content is static and can be cached, but a portion of the page is either frequently updated or personalized for each user and must be dynamically created for each request. Such situations can make caching problematic and/or can limit its effectiveness.

Existing server-based page component assembly technologies, such as ASP.NET Substitution control, or Edge Side Includes (ESI), offer mechanisms for assembling a page in parts in an optimal location in the network prior to it being sent to the client browser. Such technologies use caching, but require work to be done at the web server prior to the response getting sent to the client browser.

Existing client-based techniques attempt to optimize the execution of client-side scripts deferring the execution of client-side scripts until a point in time best suited for optimizing the user experience. The goal of such approaches is to time script execution so as to interfere as little as possible with speedy rendering of the page.

Examples of existing technologies that attempt to optimize the rendering of pages having dynamic content include:

ESI (Edge Side Includes): ESI introduces a language that allows proxy venders to compose HTML page components nearer to the client computer. ESI breaks HTML into smaller components. ESI uses a programmatic language to describe components. A disadvantage of such an approach is that it forces server developers to create services tailored for responding to ESI requests.

Partial Page Caching (ASP.NET server-side substitution control): Like ESI, Partial Page Caching breaks the pages into smaller components. Partial Page Caching uses server side components integrated into the server. Partial Page Caching does not describe the use of a dynamic query language. Using Partial Page Caching is not an automatic process. A disadvantage of such an approach is that the system must be changed to incorporate new server-side components.

ControlJS and HeadJS: These are third party libraries used to defer content that references external scripts. In general, however, such techniques are limited to acting on script and not generic HTML. Additionally, these scripts are not dynamically generated for each user request. Instead, they are static and identical across all users. In contrast, the present invention enables content that is dynamically generated with each page request and individualized for each user to be deferred/optimized.

In many conventional systems, when a dynamic web page is being served, the web server generates both the dynamic and static web content as a single integrated process. The result is a page that is unique for each user view and that cannot be stored in the cache of downstream devices using known methods for HTML response caching, because the output changes for each unique browser session. The performance advantages conferred by caching are thus limited.

SUMMARY

According to various embodiments, the system and method of the present invention can be implemented in connection with delivery of any content in a client/server system, including for example HTML responses to requests for web pages. The present invention provides various techniques for separating the rendering of such content into two distinct phases, so as to improve the applicability of HTML response caching. The system can provide automatic and/or manual configuration of which portion(s) of a page are to be dynamically created. The remaining static portion(s) of the page can be cached and delivered immediately in response to HTTP requests while the full page is being generated. This allows the static, cached portion(s) of the page to be rendered for the user quickly, while the dynamic portion(s) are extracted from the full page response and filled in as they become available (either piece-by-piece or in one operation). The system and method of the present invention enable such optimization of the user experience to occur without requiring any recoding of the original page content.

In at least one embodiment, in a first phase, an original request for a page is intercepted by an accelerator proxy and an HTML template page is returned. This template page contains only the static portion(s) of the page with placeholders for the dynamic (i.e., personalized or frequently updated) portion(s). The placeholders, as well as the original request, are all tagged with a unique transaction identifier that relates the template page to the dynamic portion(s), allowing the client browser page to be matched with the correct server response. In addition to returning the template page to the client browser, the accelerator proxy also sends the original request to the origin web server.

In a second phase of the process, the client browser renders the template page for the user. The browser displays those parts of the page that are not dynamic (i.e., those parts that are not specific to the current transaction). When this initial rendering is complete, in at least one embodiment, a polling mechanism is initiated, so as to request data for the dynamic portion(s) of the web page (i.e., the dynamic data) from the accelerator proxy based on the unique transaction identifier. In at least one alternative embodiment, a technique referred to as "long polling" is used, wherein the accelerator proxy holds open the request and waits for the origin server's response.

While waiting for the origin server's response, the accelerator proxy responds to the client's dynamic data requests with a "data unavailable" response. In an embodiment where polling is used, this causes the client to wait and make another request later. Alternatively, if long polling is used, the "data unavailable" response just causes the client to wait, and the accelerator proxy provides the data when it is available. Once the accelerator proxy receives a response from the origin server for a given request, it transforms the response so that it can be easily transmitted to the client and used by the client to fill in the missing dynamic sections of the page. In at least one embodiment, this transformation includes isolating only the dynamic portion(s) of the response and packaging them in an easily consumable format, such as XML, JSON, or the like.

Thus, a process fork is implemented: the client browser renders the template page concurrently with the origin web server responding to the original request.

When the packaged dynamic content is finally received by the client browser, the placeholder elements are replaced and the dynamic elements of the page are rendered and displayed for the user.

One example of a typical usage scenario for the present invention is an online storefront with a catalog, shopping cart, login button, and multiple advertisements that are unique to a specific user session. Typical user behavior for such an environment is to browse through the site adding items to the shopping cart until exiting through a check-out process. In such a scenario, the same request URL will return an HTML response to each user that only differs from the others in a few select regions of the page. These regions containing dynamic content are the most demanding on the web server and take the longest to generate because they cannot generally be pre-created and cached.

In such a scenario, initially, before the user is identified and begins adding items to his or her cart, the system is able to cache and use default content views which do not generally change for different user sessions. Once the user has logged in or has begun to add items to his or her cart, the system can no longer use cached information for those parts of the web pages that represent unique data for each user (such as, for example, an indication of which items are currently in a user's cart). In conventional systems, such inability to use cached information often causes a delay prior to the displaying of the page, during which the server is generating the content that is specific to the user session (e.g., shopping cart data) and combining it with the static portions, and finally delivering a fully composed HTML response containing both dynamic and static portions to the user as a single unified response. When servers are under load, this delay increases.

The system of the present invention provides a mechanism for improved performance and responsiveness under such conditions. Once the user begins creating unique session content (for example, by adding products to his or her shopping cart) the system of the present invention allows for continued caching of static portions while providing full integration of dynamic elements with minimal delay or latency. More specifically, once dynamic portions of the web page have been identified, the cached version of the web page includes placeholders in those regions of the page where the dynamic content was identified. These placeholders can take various visible forms, such as displaying nothing, displaying a loading icon, or displaying a placeholder rectangle to help reduce reflows during rendering. In at least one embodiment, the dynamic content regions are populated when the data is available from the origin web server. In another embodiment, the dynamic content regions are populated when the data is available from one or more web services created to generate only the dynamic content. This yields an effect in which the dynamic regions of the page 'pop' in after a delay roughly equivalent to the original blank screen duration experienced when the technique is not applied.

In this manner, the web page can remain fully interactive, even while dynamic portions are still being populated. The user can freely interact with cached, static portion of the page without waiting for the full page to display. While the user interacts with the cached portion(s) of the page, the full page is generated by the origin server and delivered to the accelerator proxy, which extracts the dynamic portion(s) and delivers them to the browser. The browser then fills in the missing sections of the page.

In various embodiments, the techniques of the present invention are particularly useful in situations where the dynamic portions of the page are not the focal point for the user experience. For example, the technique works well when it is applied to a catalog site where all users see the same items but may have different items in their carts. However, one skilled in the art will recognize that the techniques described herein can be implemented in any suitable environment wherein both static and dynamic content are to be presented.

In at least one embodiment, the method of the present invention is implemented in a system for presenting web-based content, such as web pages, to a user. One example of such a system is a client/server architecture in which software, such as a browser running on a client machine, requests content from a server, including HTML pages and/or other resources. The content is delivered over a communications network such as the Internet, using known communications protocols such as HTTP and TCP/IP. In at least one embodiment, an accelerator proxy and/or edge accelerator proxy intercept client requests for content and process such requests according to the techniques described herein.

In the examples and drawings presented herein, the present invention is described in connection with mechanisms for optimizing the presentation of content in web pages, as they may be presented on a browser running on a client. However, one skilled in the art will recognize that the methods of the present invention can also be applied to other forms of optimization, including optimization of any suitable types of resources. In addition, one skilled in the art will recognize that the methods of the present invention can also be applied to systems using protocols other than HTTP, resource requests other than HTML web pages, and files of any format. In short, the techniques described herein can be applied to any suitable type of data or content delivered across any electronic network and presented using any suitable output mechanism(s).

The system of the present invention can be implemented using a network appliance (also referred to as an accelerator or accelerator proxy) that intercepts and processes web page requests before they reaches the server, provides template pages, and transforms responses received from the server so as to identify dynamic portion(s) therein, and relaying such dynamic portion(s) to the client. Such an appliance can be located, for example, in a data path between the server and the client. Such an appliance can be incorporated in a hardware device such as a router, or it can be a standalone device. Alternatively, the system of the present invention can be implemented by software running at the client and/or server, or any combination thereof.

In at least one embodiment, the present invention can be combined with other optimization techniques, such as those described in the following related applications:

U.S. Utility application Ser. No. 12/187,233 for "Partial Content Caching," filed Aug. 6, 2008;

U.S. Utility application Ser. No. 12/426,909 for "Extensible, Asynchronous, Centralized Analysis and Optimization of Server Responses to Client Requests," filed Apr. 20, 2009;

U.S. Utility application Ser. No. 13/110,524 for "Accelerating HTTP Responses in a Client/Server Environment," filed May 18, 2011; and/or U.S. Utility application Ser. No. 13/357,624 for "Image Optimization," filed Jan. 25, 2012.

The disclosures of these related applications are incorporated herein by reference.

In at least one embodiment, the present invention can be combined with or can build upon existing optimization technologies such as those described above, including but not limited to ESI, Partial Page Caching, and/or third party libraries such as ControlJS and HeadJS.

One skilled in the art will recognize that the optimization techniques described herein can be applied to other scenarios and conditions, and are not limited to the specific examples discussed herein.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention. In particular, the sequence diagrams provided herein are intended to show an example of a particular sequence of events that can be used to implement the invention. One skilled in the art will recognize, however, that the events can take place in a different sequence, and/or that some events can be omitted and/or others added, without departing from the essential characteristics of the invention as set forth in the claims.

FIG. 6B is a sequence diagram depicting a method of servicing a request for a cached page according to one embodiment.

FIG. 6C is a sequence diagram depicting a method of servicing a request for an edge cached page according to one embodiment.

DETAILED DESCRIPTION OF THE EMBODIMENTS

System Architecture

Figure 1A:
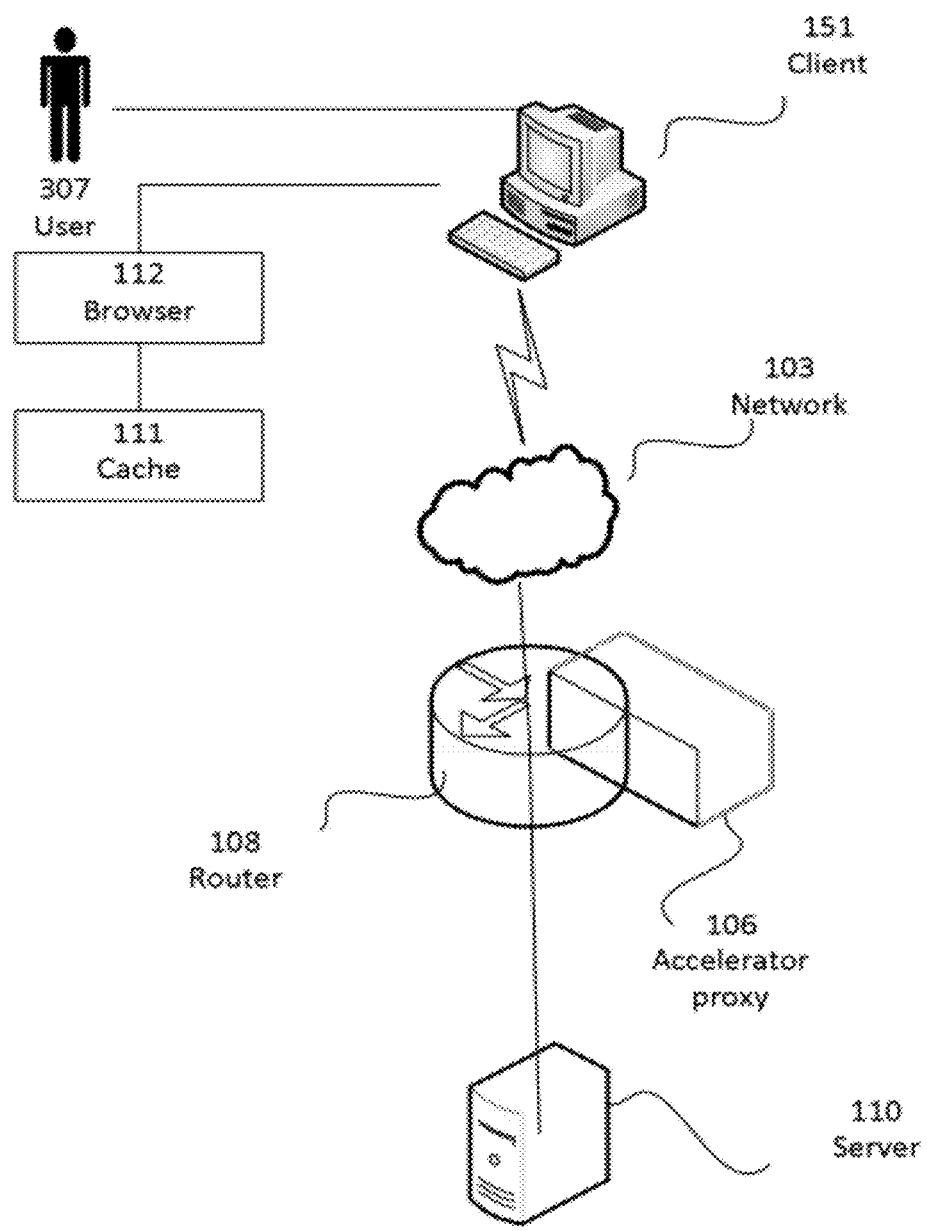
FIG. 1A depicts an architecture for practicing the present invention according to one embodiment, wherein an accelerator proxy for optimizing the rendering of dynamic content resides in a network device such as a router.

Referring now to FIG. 1A, there is shown an architecture for practicing the present invention according to one embodiment, wherein an accelerator proxy 106 (also referred to as an optimizer) for performing the techniques of the present invention resides in a network device such as router 108. As depicted in FIG. 1A, in such a configuration, accelerator proxy 106 is positioned between server 110 and client machine 151. Server 110 may be an HTTP server, web server, or other server; client machine 151 may be an HTTP client or any other electronic device capable of sending and receiving messages on network 103. Network 103 may be the Internet or any other network that enables communication among two or more electronic devices. Network 103 may be implemented using well-known network protocols such as Hypertext Transfer Protocol (HTTP), Secure Hypertext Transfer Protocol (SHTTP), Transmission Control Protocol/Internet Protocol (TCP/IP), and/or the like. In some embodiments, secure access to network 103 may be facilitated via well known techniques such as a Virtual Private Network (VPN), although such secure access is not required.

Client 151 and/or server 110 may be computers or any other electronic devices. Examples include, without limitation, a desktop computer, laptop computer, personal digital assistant (PDA), cellular telephone, smartphone, music player, handheld computer, tablet computer, kiosk, game system, enterprise computing system, server computer, or the like. In at least one embodiment, client 151 and/or server 110 are desktop computers running an operating system such as for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google Inc. of Mountain View, Calif.; and/or any other operating system that is adapted for use on such devices.

In at least one embodiment, client 151 and/or server 110 each include a number of hardware components as are well known to those skilled in the art, including for example one or more input devices (such as a keyboard, mouse, touchscreen, trackball, trackpad, five-way switch, voice input device, joystick, and/or any combination thereof), one or more output devices (such as a screen, speaker, printer, and/or any combination thereof), one or more processors (which can be a conventional microprocessor for performing operations on data under the direction of software, according to well-known techniques), memory (such as random-access memory having a structure and architecture as are known in the art, for use by the one or more processors in the course of running software), and/or local storage (which can be any magnetic, optical, and/or electrical storage device for storage of data in digital form, such as flash memory, magnetic hard drive, CD-ROM, and/or the like). Such components are well known in the art of computing architecture and are thus omitted from FIG. 1A for clarity.

One skilled in the art will recognize that the particular arrangement of hardware elements shown in FIG. 1A is merely exemplary, and that the invention can be implemented using different hardware elements configured in any of a number of different ways. Thus, the particular architecture shown in FIG. 1A is merely illustrative and is not intended to limit the scope of the invention in any way.

One skilled in the art will recognize that any number of devices, singly or in any combination, may be configured to fulfill the roles of client 151 and/or server 110 described herein without departing from the scope of the present invention.

In at least one embodiment, client 151 operates under the direction and control of user 307, who interacts with client 151 via a user interface according to well-known techniques. As described herein, user 307 may be an administrator or an end user.

Client 151 may run web browser 112 and/or another software application for enabling network communications and for presenting content, such as web pages including static and/or dynamic elements, to user 307. For illustrative purposes, the invention is described herein in terms of requesting, receiving, and rendering web pages including static and dynamic elements at browser 112 running on client 151.

In at least one embodiment, router 108 is implemented as a computing device configured to route network traffic between client 151 and server 110 according to well known mechanisms. Router 108 may include optimization and acceleration components as described in related U.S. Utility application Ser. No. 12/426,909 for "Extensible, Asynchronous, Centralized Analysis and Optimization of Server Responses to Client Requests," filed Apr. 20, 2009, the disclosure of which is incorporated herein by reference. Such components may include, for example, accelerator proxy 106 as described in the related application.

In at least one embodiment, accelerator proxy 106 can be implemented as a software-based component of router 108. Accordingly, router 108 may include a processor (not shown) for performing the techniques of the present invention in accordance with software and/or firmware instructions.

Figure 1B:
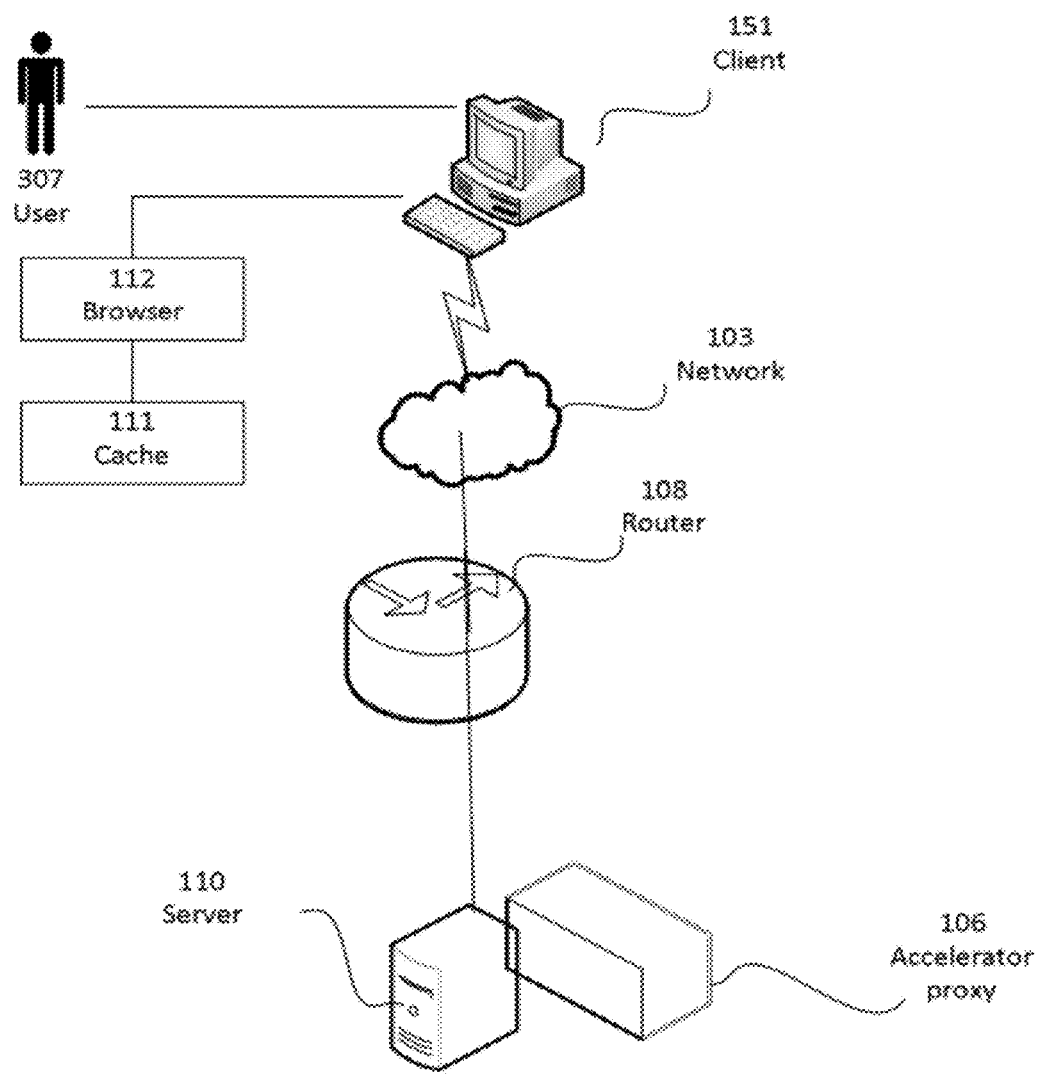
FIG. 1B depicts an architecture for practicing the present invention according to one embodiment, wherein an accelerator proxy for optimizing the rendering of dynamic content resides in a server.

Referring now to FIG. 1B, there is shown an architecture for practicing the present invention according to another embodiment, wherein accelerator proxy 106 resides in server 110. One skilled in the art will recognize that the techniques of the present invention can be implemented in an accelerator proxy 106 or other component having any suitable location within the overall network architecture, and that the particular arrangements shown in FIGS. 1A and 1B are merely exemplary. For example, accelerator proxy 106 can be implemented as part of a stand-alone network appliance located in the communication path between client 151 and server 110. Accelerator proxy 106 can also be implemented using any number of network appliances and/or other components in any suitable combination.

In at least one alternative embodiment, the steps performed by accelerator proxy 106 are performed at browser 112 itself, and cache 111 of browser 112 is used for storing template pages including static portion(s) of web pages. Thus, in accordance with the techniques described herein, these template pages can retrieved from browser cache 111 and can be rendered and displayed while browser 112 itself makes requests from server 110 for dynamic content. In yet another embodiment, template pages are cached at browser 112, but requests for dynamic content are still made by a separate accelerator proxy 106.

Figure 2A:
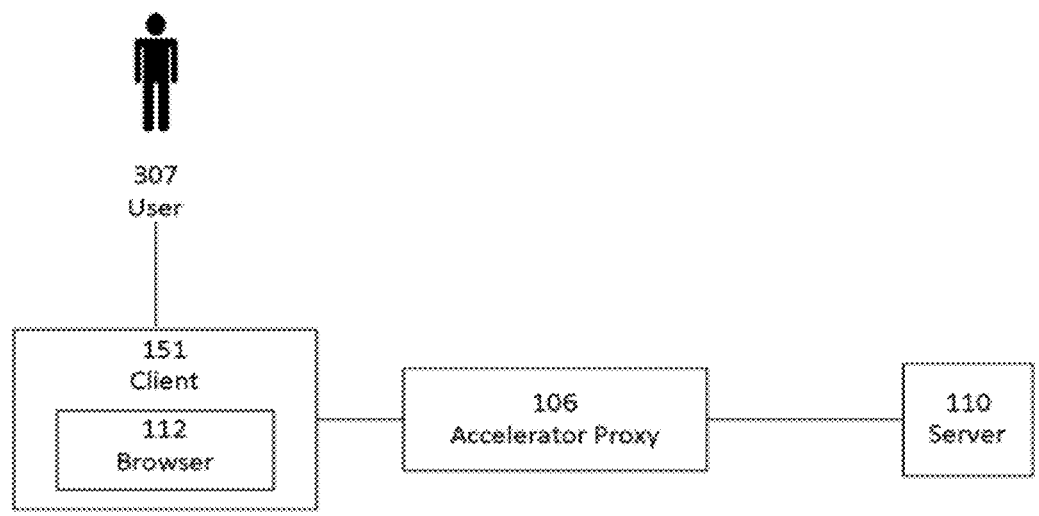
FIG. 2A is a block diagram depicting a conceptual architecture for implementing the present invention according to one embodiment.

Referring now to FIG. 2A, there is shown a block diagram depicting a conceptual architecture for implementing the present invention according to one embodiment. The depicted architecture is merely exemplary; the system of the present invention can be implemented using any number of software and/or hardware components in any suitable configuration.

Client 151 can be any conventional computing system or machine, or any other electronic device capable of displaying content on an output device such as a display screen. Client 151 can run browser software 112 for presenting such content, such as web pages including static and dynamic content received from server 110 in response to requests. Browser 112 can be any conventional browser, such as for example Microsoft Internet Explorer, available from Microsoft Corporation of Redmond, Wash.; Chrome, available from Google, Inc. of Mountain View, Calif.; Firefox, available from Mozilla Corporation of Mountain View, Calif.; or Safari, available from Apple Inc. of Cupertino, Calif.

Server 110 may be a web server or any other type of server, such as an HTTP server capable of receiving requests via HTTP and returning content in response to such requests.

User 307 interacts with client 151, for example by typing URLs and clicking on links within browser software 112. In response to such actions, browser 112 makes requests of web pages, images, and other resources from server 110. Such requests can be transmitted via an electronic network such as the Internet, although any suitable wired and/or wireless network can be used.

Accelerator proxy 106 acts as an intermediary which performs operations such intercepting client 151 requests for content, and modifying content (such as web pages in the form of HTML code) obtained from server 110, before such content reaches client 151. Accelerator proxy 106 can be implemented as any other suitable device, such as an HTTP proxy capable of parsing and rewriting HTML responses. Such a proxy can be implemented, for example in a network appliance capable of intercepting and/or relaying requests, responses, and/or other messages traveling between server 110 and client 151. In at least one embodiment, client 151, server 110, and accelerator proxy 106 communicate with one another via an electronic network such as the Internet, although any suitable wired and/or wireless network can be used.

In at least one embodiment, accelerator proxy 106 intercepts and forwards client 151 requests that are addressed to server 110, and processes such requests according to various techniques described herein. Such processing may include, for example, returning a template page that can be rendered at browser 112, while requesting dynamic data from server 110.

Each of these components can be implemented using any combination of hardware, firmware, and software. For example, the components may be implemented as software modules for controlling the operation of a processor in accelerator proxy 106. Any number of these components can be implemented in a network appliance, accelerator, accelerator proxy 106, server 110, router 108, client 151, or any combination thereof.

Figure 2B:
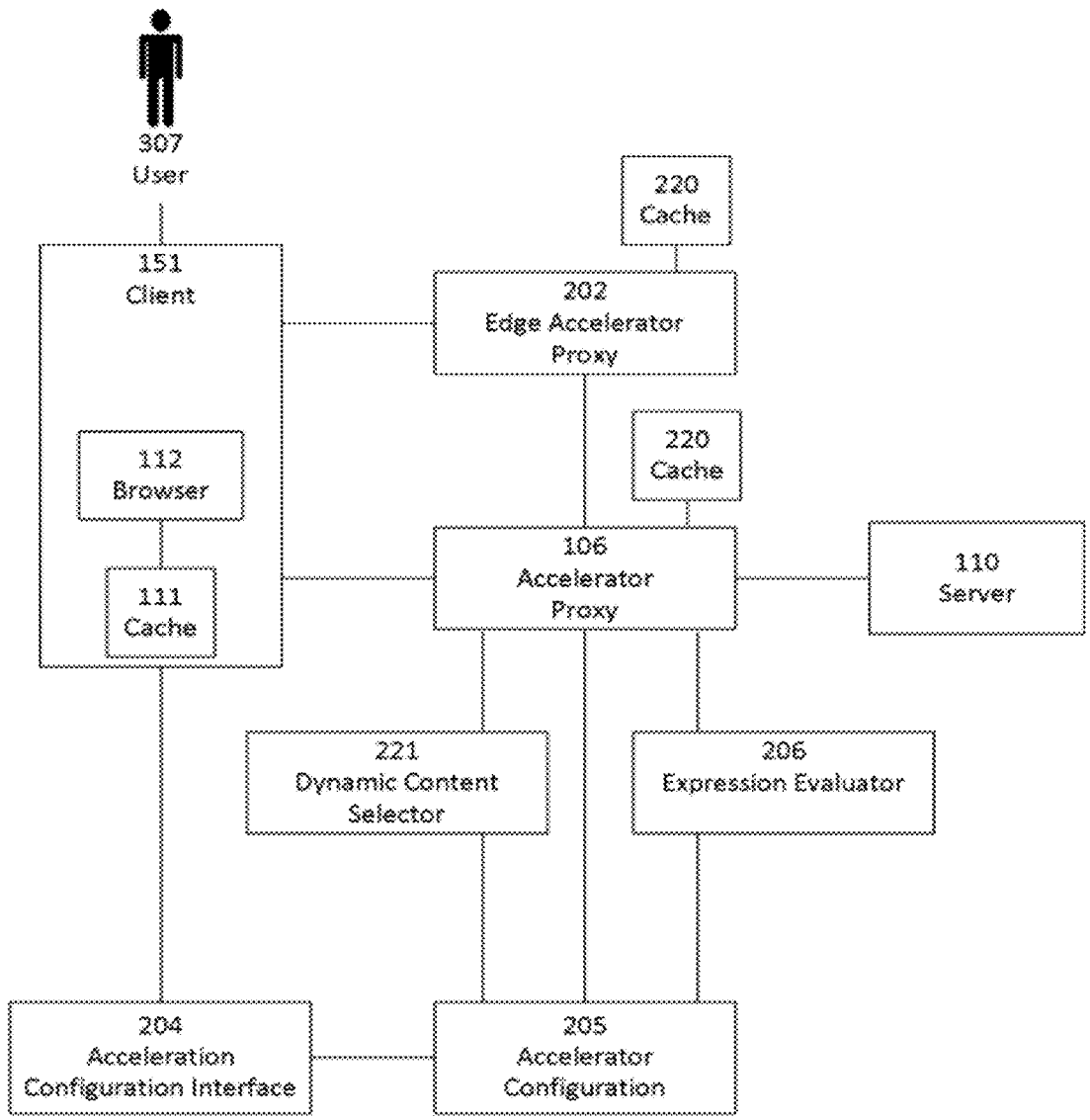
FIG. 2B is a block diagram depicting a more detailed conceptual architecture for implementing the present invention according to one embodiment.

Referring now to FIG. 2B, there is shown a block diagram depicting a more detailed conceptual architecture for implementing the present invention according to one embodiment. This diagram illustrates how the various functional components of the system interact with one another. In at least one embodiment, action is initialized by browser 112 running on client 151, for example in response to input received form user 307, or by acceleration configuration interface 204. Acceleration configuration interface 204 can be implemented in any suitable manner, and may run at client 151 or at any other suitable location; it may be implemented, for example as a stand-alone client or web based graphical user interface (GUI), or as a programmatic interface (for example, as a remote procedure call (RPC), web service, or Representational State Transfer (REST)). These interface components are used to define the system configuration data for operation of the system of the present invention. Based on input from an administrator, using either manual or automatic configuration mechanisms, accelerator configuration module 205 configures dynamic content selector 221 so that a determination can be made as to which portion(s) are static and which are dynamic for a given web page. In at least one embodiment, dynamic content selector 221 is a software component that can be configured by accelerator configuration module 205 and then stored by accelerator proxy 106 for use in identifying dynamic portion(s) of web pages. In this manner, the techniques of the present invention can thereby by applied to dynamic content.

In at least one embodiment, the system and method of the present invention can be used in connection with a system that samples content in order to automatically generate instructions, as described in related U.S. Utility application Ser. No. 12/426,909 for "Extensible, Asynchronous, Centralized Analysis and Optimization of Server Responses to Client Requests," filed Apr. 20, 2009, the disclosure of which is incorporated herein by reference. Such an automated system can be used in connection with the system and method of the present invention to identify portions of pages.

In operation, according to at least one embodiment, browser 112 requests a web page. The request may be intercepted by accelerator proxy 106 or edge accelerator proxy 202. Accelerator proxy 106 loads a dynamic content selector query from accelerator configuration 205, and uses expression evaluator 206 to apply the selector to an HTML response obtained from server 110. Further details and steps are described herein.

Browser 112 may have access to cache 111 for storage of certain static elements of web pages at client 151. Either or both of accelerator proxy 106 and edge accelerator proxy 202 may have access to caches 220 for storage of elements of web pages for subsequent rendering.

The particular architecture depicted in FIG. 2B is merely exemplary. In various embodiments, there may be one or many accelerator proxy devices 106, which be located in one common data center, or which may be distributed in multiple data centers at different locations, so as to be located logically closer to end users.

Method

Figure 3:
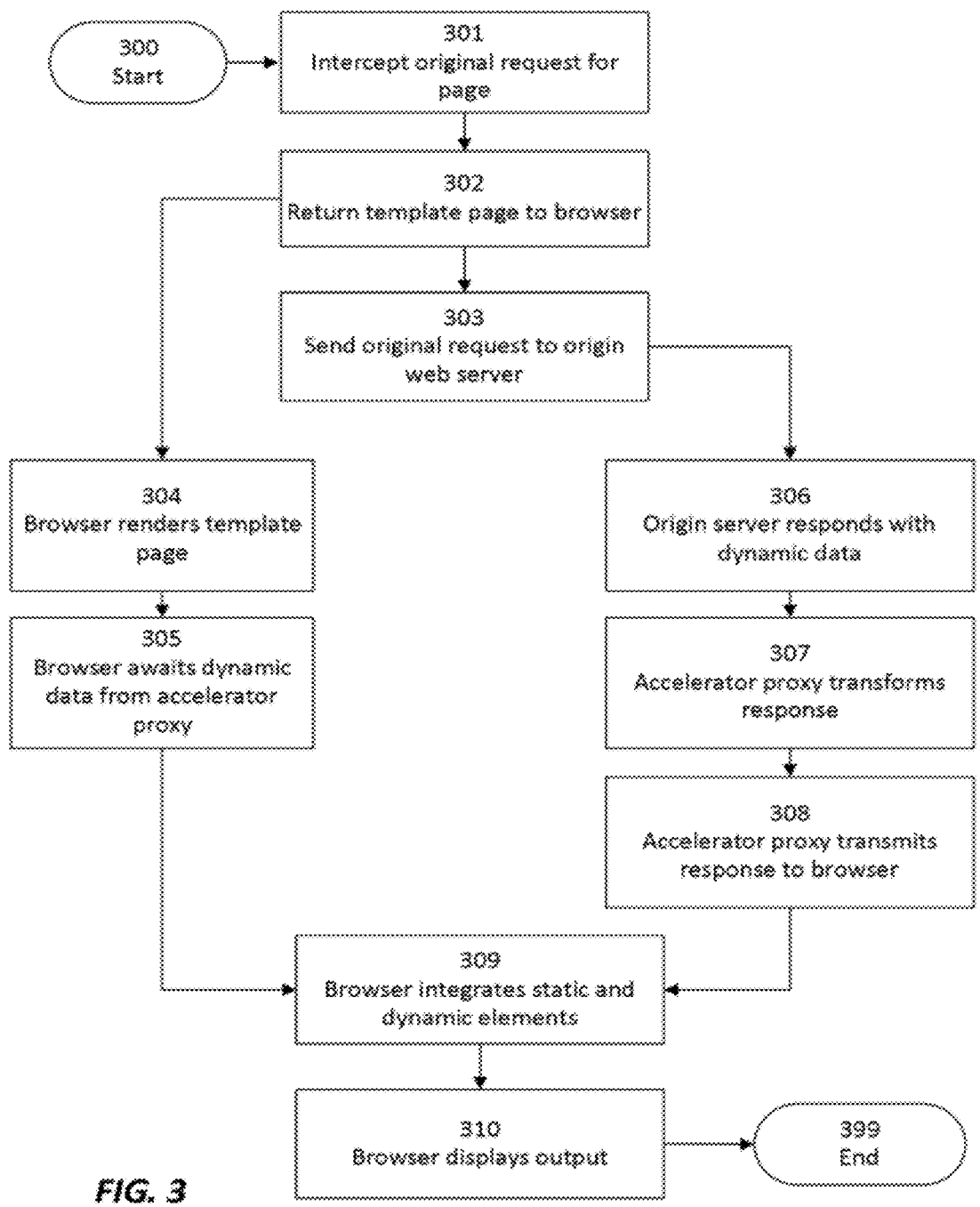
FIG. 3 is a flow diagram depicting a method of optimizing the rendering of dynamic content according to one embodiment.

Referring now to FIG. 3, there is shown a flow diagram depicting a method of optimizing the rendering of dynamic content according to one embodiment according to one embodiment. The steps of FIG. 3 may be variously performed by accelerator proxy 106, server 110, browser 112, and/or any other suitable components.

In at least one embodiment, accelerator proxy 106 intercepts 301 a request for a web page or other resource from browser 112. Such request may be, for example, addressed to server 110. Accelerator proxy 106 returns 302 an HTML template page to browser 112. In at least one embodiment, this template page contains only the static portion(s) of the page, with placeholders for the dynamic (i.e., personalized or frequently updated) portion(s) of the page. The placeholders, as well as the original request, are all tagged with a unique transaction identifier that relates the template page to the dynamic portion(s), allowing the template page to be matched with the correct dynamic content when they are to be integrated with one another. In addition to returning the template page to browser 112, accelerator proxy 106 also sends 303 the original request to the server 110 (also referred to as the "origin server" or "origin web server").

This represents a process fork: browser 112 renders 304 the template page concurrently with server 110 responding 306 to the original request with dynamic data. In rendering the template page, browser 112 displays those parts of the page that are not dynamic (i.e., those parts that are not specific to the current transaction). When this initial rendering is complete, in at least one embodiment, browser 112 awaits 305 dynamic data from accelerator proxy 106; this may be done by a polling mechanism that requests the dynamic data from accelerator proxy 106 based on the unique transaction identifier. Alternatively, a technique referred to as "long polling" can be used, wherein accelerator proxy 106 holds open the request and waits for server's 110 response.

While waiting for server's 110 response, accelerator proxy 106 responds to browser's 112 dynamic data requests with a "data unavailable" response. In an embodiment where polling is used, this causes browser 112 to wait and send another request later; alternatively, if long polling is used, the "data unavailable" response just causes browser 112 to wait.

Server 110 responds 306 to the request received from accelerator proxy 106 with dynamic data suitable for presentation in connection with the template page that has been (or is being) rendered at browser 112. Once accelerator proxy 106 receives a response from server 110 for a given request, it transforms 307 the response so that it can be easily transmitted to browser 112 and used by browser 112 to fill in the missing dynamic portion(s) of the page. In at least one embodiment, this transformation includes isolating only the dynamic elements of the response and packaging them in an easily consumable format, such as XML, JSON, or the like. Accelerator proxy 106 then transmits 308 the transformed response to browser 112.

When the packaged dynamic content is finally received by browser 112, the static and dynamic elements are integrated 309 with one another. This may be performed, for example by replacing the placeholder elements, and rendering the dynamic elements for display 310.

In at least one embodiment, various methods and procedures are performed in order to implement the techniques of the present invention. In at least one embodiment, an administrator can configure the system for use with either manual or automatic configuration directives. Based on such configuration, content is captured, groomed, and cached by accelerator proxy 106 for use in processing future requests. When user 307 browses to a page that has been appropriately processed and is (at least partially) present in proxy cache 220 and/or browser cache 111, the static portion(s) of the page are returned immediately for presentation to user 307; concurrently, the full page (or dynamic portion(s) thereof) is/are composed on server 110. As described above, when accelerator proxy 106 receives the response from server 110, it transforms the response to include only the dynamic elements, and saves the result in preparation for a request from browser 112 to provide the additional code for completing rendering of the page.

In one embodiment, a new web service or set of web services can be created to provide the missing dynamic content to accelerator proxy 106. This enables accelerator proxy 106 to complete the page without having to call server 110.

Browser 112 issues a request for the dynamic portion(s) of the page; once those portion(s) are received from accelerator proxy 106, they are rendered for display to user 307.

In at least one embodiment, the system of the present invention operates in response to input received from at least two user roles: an administrator and an end user. The administrator configures accelerator proxy 106 so as to specify that it perform the various steps described herein. Such configuration can be manual or automatic, as described herein. This process is described in more detail in connection with FIGS. 4A, 4B, and 4C.

Figure 5A:
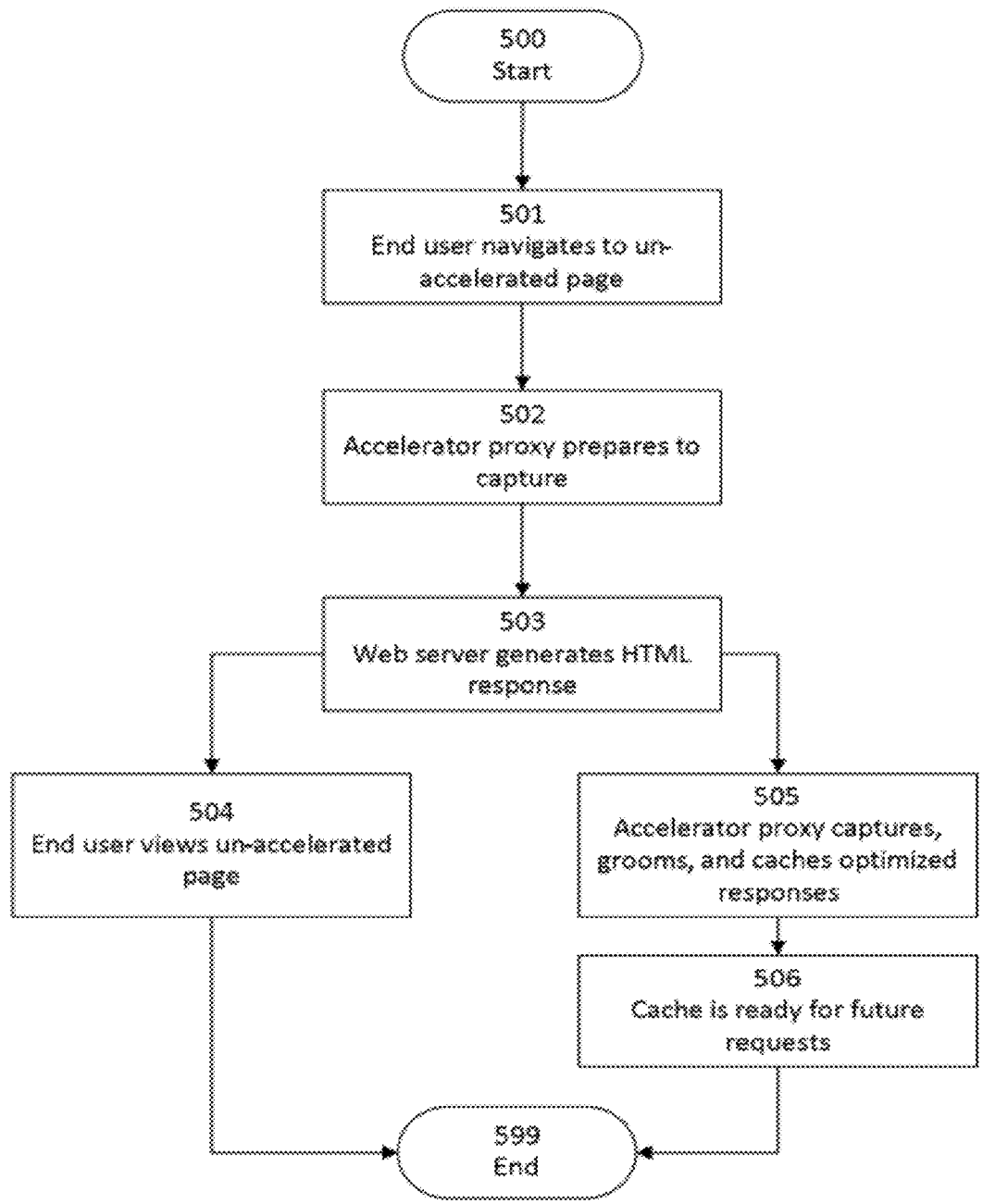
FIG. 5A is a flow diagram depicting a method of servicing a request for a non-cached page according to one embodiment.
Figure 5B:
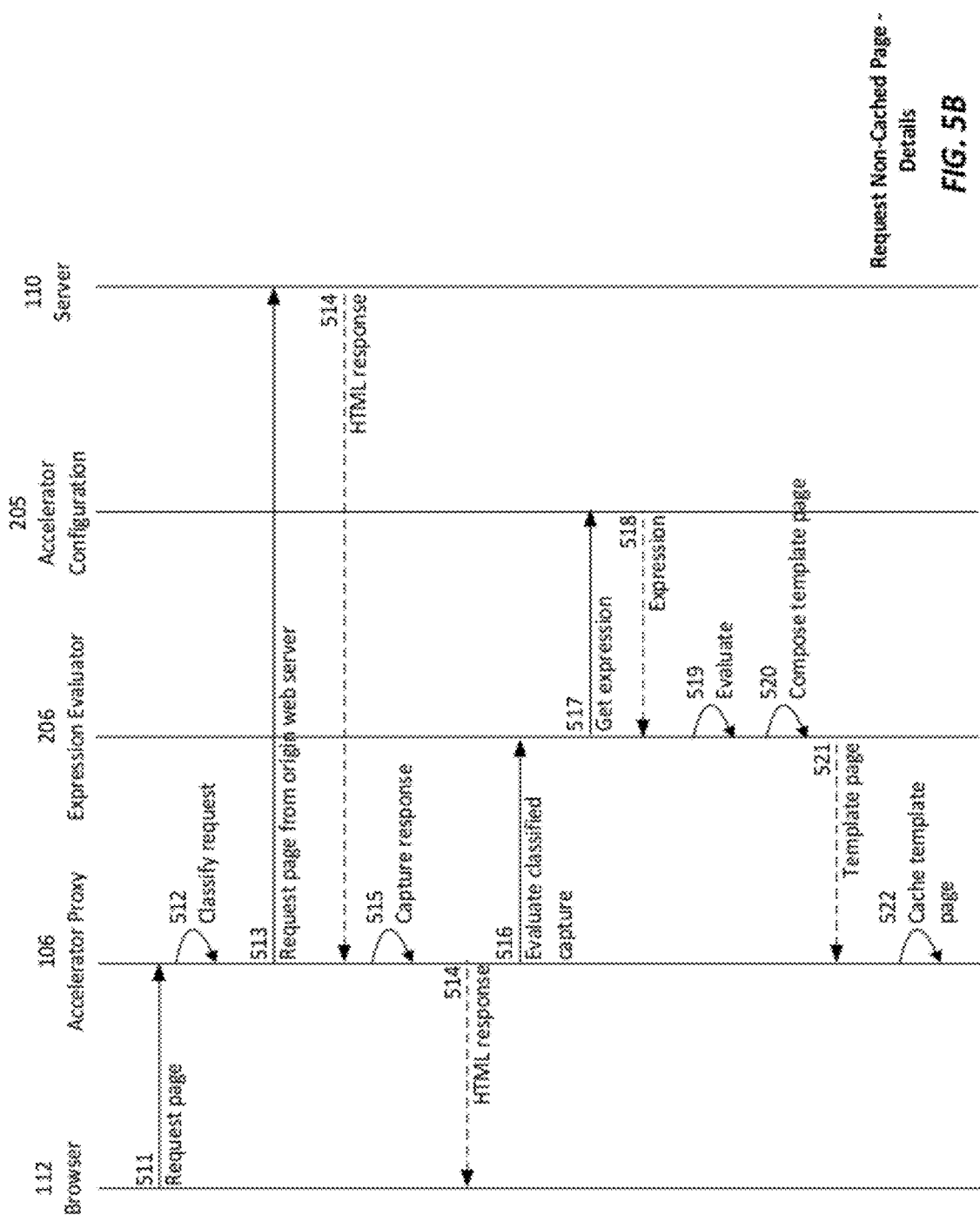
FIG. 5B is a sequence diagram depicting a method of servicing a request for a non-cached page according to one embodiment.
Figure 6A:
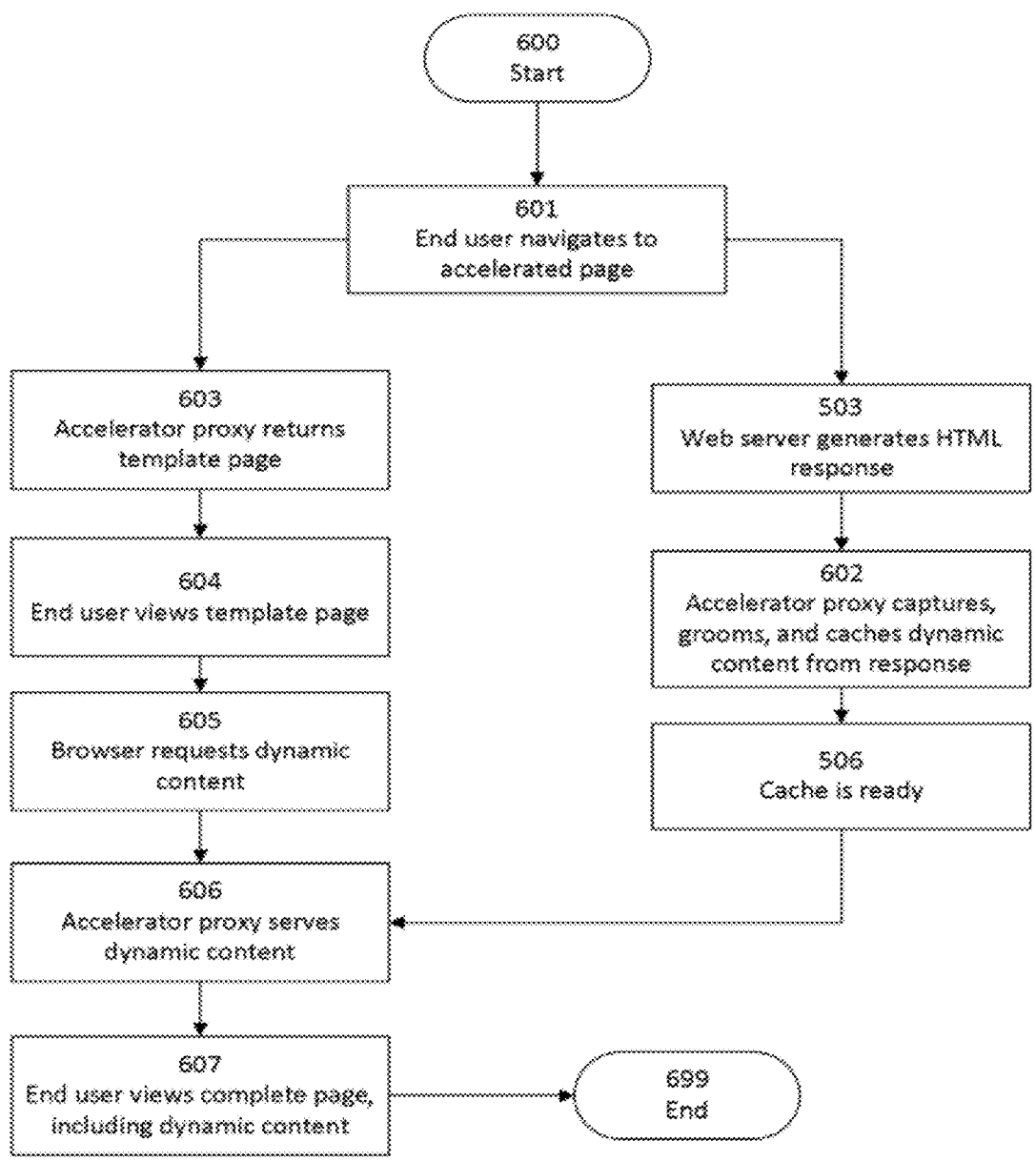
FIG. 6A is a flow diagram depicting a method of servicing a request for a cached page according to one embodiment.

The end user, also referred to herein as user 307, makes requests to the system in one of the following contexts:
- request non-cached page, wherein the system has not yet cached the static portion(s) of the requested page, or the requested page is not configured for caching (described in more detail in connection with FIGS. 5A and 5B);
- request cached page, wherein the static portion(s) of the requested page have been cached (described in more detail in connection with FIGS. 6A and 6B); and
- request edge cached page, wherein the static portion(s) of the requested page have been cached at a cache 220 associated with edge accelerator proxy 202 (described in more detail in connection with FIG. 6C).

Configure Dynamic Content Selector

Figure 4A:
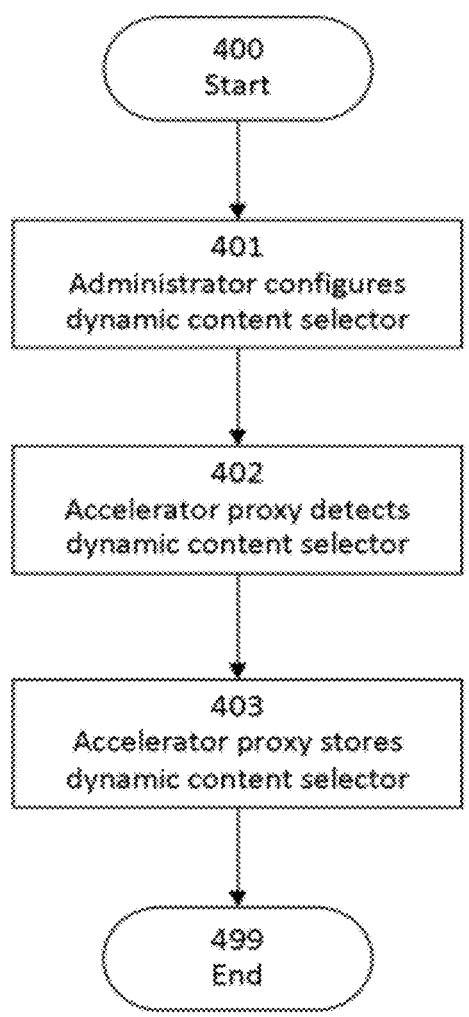
FIG. 4A is a flow diagram depicting a method of configuring a dynamic content selector according to one embodiment.

Referring now to FIG. 4A, there is shown a flow diagram depicting a method of configuring dynamic content selector 221 according to one embodiment.

The administrator configures 401 dynamic content selector 221, either manually or automatically. This defines and prepares dynamic content selector 221, so that selector 221 can be used in detecting dynamic portion(s) of web pages according to the techniques described herein. Accelerator proxy 106 detects 402 dynamic content selector 221 and stores 403 it for use in detecting dynamic portion(s) of web pages.

Figure 4B:
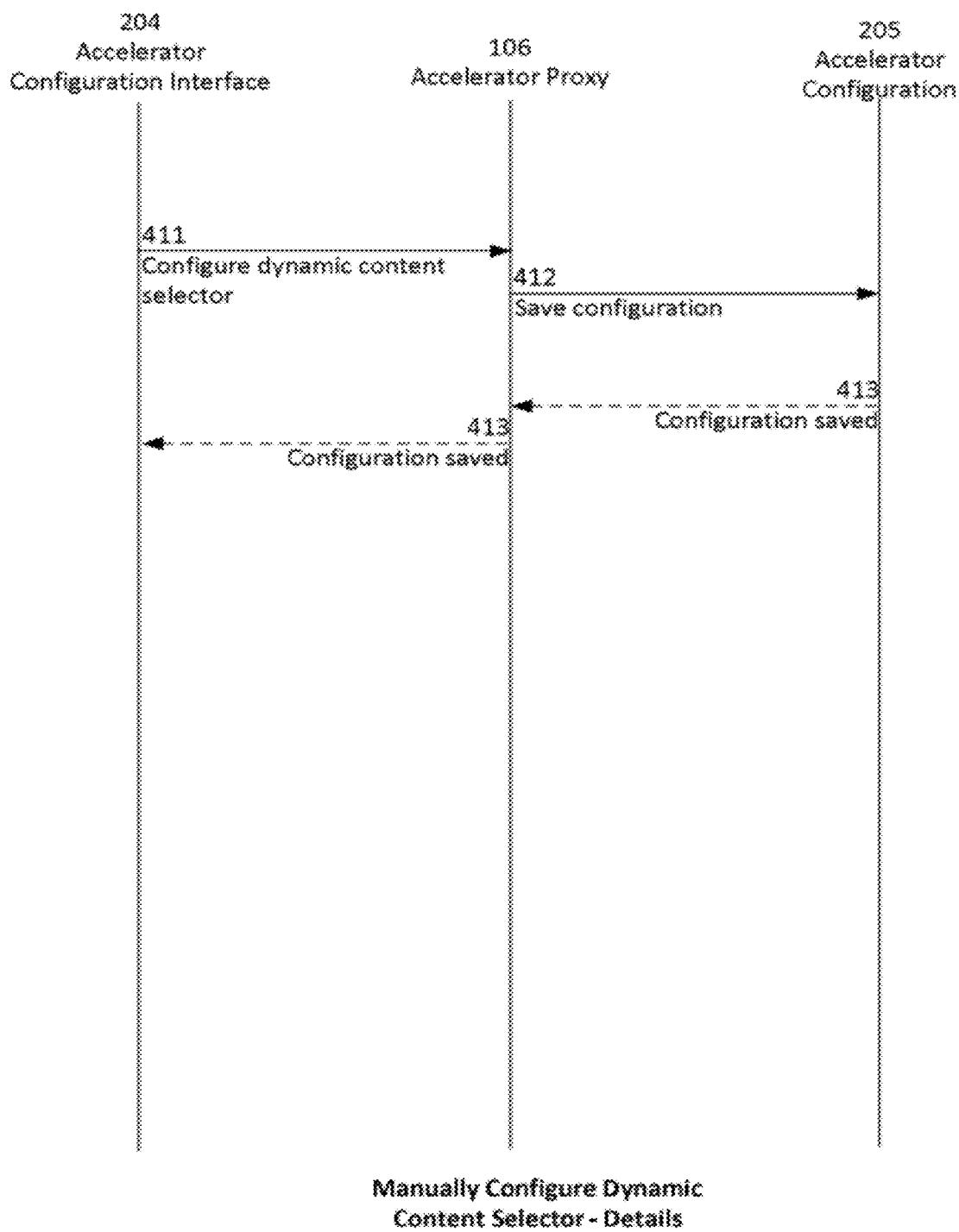
FIG. 4B is a sequence diagram depicting a method of manually configuring a dynamic content selector according to one embodiment.

Referring now to FIG. 4B, there is shown a sequence diagram depicting a method of manually configuring dynamic content selector 221 according to one embodiment. In at least one embodiment, in the case of manual configuration, the administrator uses a query language such as XPath, RegEx, or the like, to configure selector 221. The administrator may perform such operations using accelerator configuration interface 204. Based on input provided via interface 204, dynamic content selector 221 is configured 411, and the configuration 205 is saved 412 by accelerator proxy 106. In at least one embodiment, an acknowledgement message 413 may be provided, to indicate that configuration 205 has been saved.

Figure 4C:
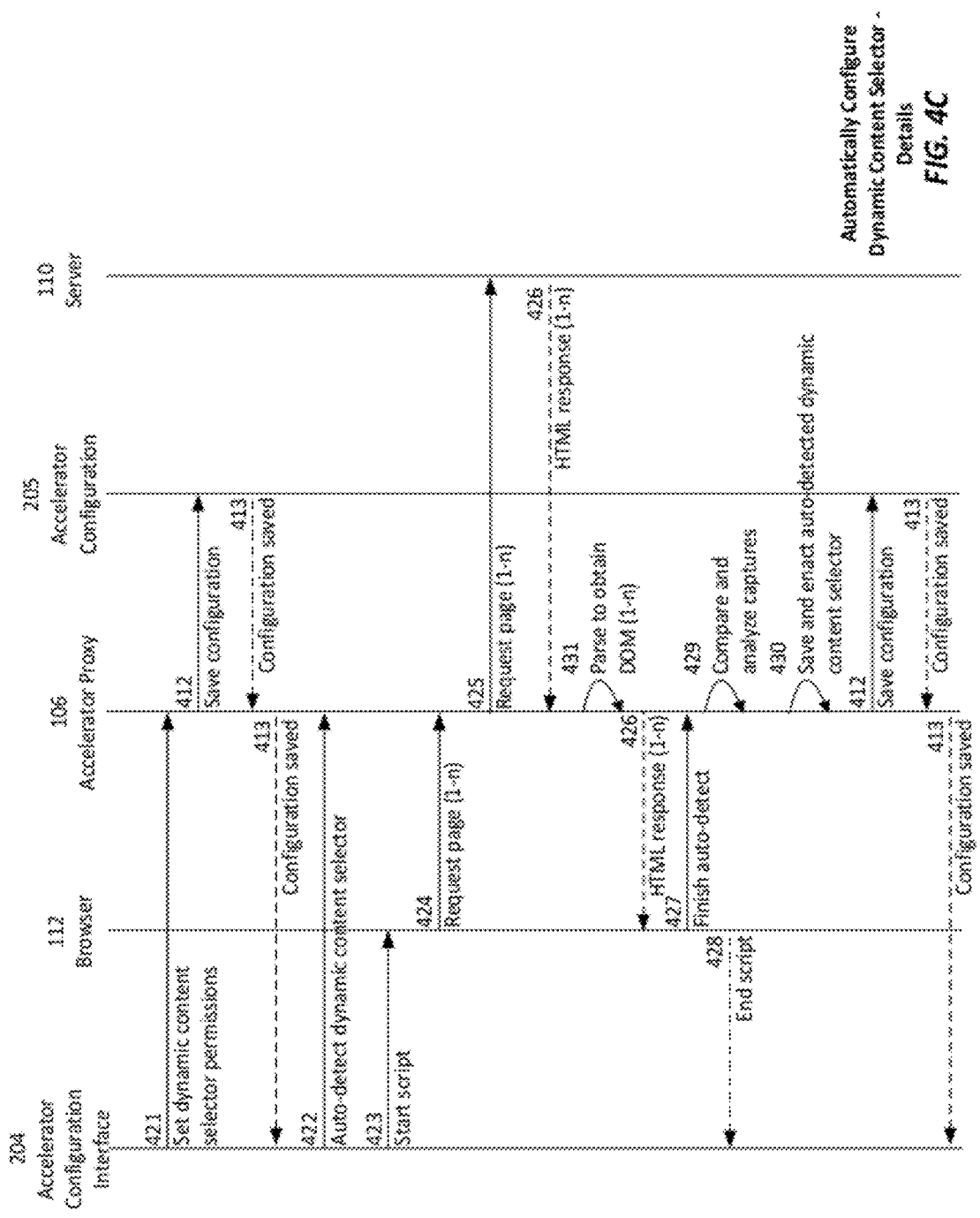
FIG. 4C is a sequence diagram depicting a method of automatically configuring a dynamic content selector according to one embodiment.

Referring now to FIG. 4C, there is shown a sequence diagram depicting a method of automatically configuring dynamic content selector 221 according to one embodiment. In the case of automatic configuration, accelerator proxy 106 repeatedly samples composed web page responses to multiple requests, in order to determine which portion(s) of the page are dynamic. Accelerator proxy 106 then automatically creates and stores a dynamic content selector 221 query which isolates the dynamic portion(s) of the composed content.

As depicted in FIG. 4C, the method begins by setting 421 dynamic content selector 221 permissions according to input received from the administrator via accelerator configuration interface 204. Accelerator proxy 106 saves 412 accelerator configuration 205, and appropriate acknowledgement message 413 is returned to proxy 106 and relayed to the administrator via interface 204.

In this embodiment, dynamic content selector 221 query is determined by the system assuming one or more end user roles (defined, for example, by user login permissions/credentials) and then acting as an end user and automatically navigating through the site. As it performs this automatic navigation, in a manner similar to a "bot", it compares the responses for all the pages for the user roles (i.e., logins) specified by the configuration referred to in dynamic content selector 221. This comparison among elements in the response when only the user role is varied allows the system to determine which portions of the page are dynamic. The corresponding dynamic content selector 221 query can thus be derived and stored for each instruction.

Based on input from the administrator, interface 402 initiates auto-detection 422 of dynamic content selector 221. A script is started 423. In accordance with the script, browser 112 requests 424 some number of pages for configuration purposes. Accelerator proxy 106 relays 425 these requests to server 110, which returns HTML responses 426. Accelerator proxy 106 relays HTML responses 426 to browser 112, and also parses 431 these responses 426 into an HTML Document Object Model (DOM), applying the content selector query to separate the document into cached vs. dynamic sections. Once the specified number of pages have been requested, browser 112 sends a signal 427 to accelerator proxy 106 to indicate that the auto-detection script has finished, and the operation of the script is ended 428.

Accelerator proxy 106 compares 429 and analyzes the captured DOMs to establish dynamic content selector 221 based on a determination of which portion(s) of pages tend to have different content from one instance to another. The automatically detected dynamic content selector 221 is saved 430 and put into effect. Accelerator proxy 106 saves 412 accelerator configuration 205, and appropriate acknowledgement message 413 is returned to proxy 106 and relayed to the administrator via interface 204.

Request Non-Cached Page

Referring now to FIG. 5A, there is shown a flow diagram depicting a method of servicing a request for a non-cached page according to one embodiment. In the scenario depicted in FIG. 5A, user 307 causes browser 112 to request a web page for which accelerator proxy 106 has not stored a template page; this is also referred to as a "cold cache" state. In at least one embodiment, the user experience is not initially affected by the techniques described herein, as no acceleration of the rendered page can yet be applied; however, the system internally prepares itself for servicing subsequent requests in an accelerated manner. In at least one embodiment, the system can be configured to sample any number of pages during this "warm-up" phase, and/or to resample periodically so as to store the best-fit version of the template page in accelerator proxy's 106 cache 220.

As depicted in FIG. 5A, user 307 navigates 501 to an unaccelerated page. This causes browser 112 to issue a request for the web page. The request is intercepted by accelerator proxy 106, which then prepares to capture information from the response. Once accelerator proxy 106 has relayed the request to server 110, server 110 generates 503 an HTML response including content for the web page. This response is relayed to browser 112 so that user 307 can view 504 the web page. Concurrently with the web page being presented at browser 112, accelerator proxy 106 captures 505, grooms, and caches optimized responses for future requests. In particular, static portion(s) of web pages, as defined by dynamic content selector 221, are captured and cached. Once these responses have been cached, cache 220 is ready 506 for future requests wherein acceleration can be applied.

Referring now to FIG. 5B, there is shown a sequence diagram depicting, in more detail, a method of servicing a request for a non-cached page according to one embodiment. Browser 112 issues request 511 for a web page. Accelerator proxy 106 intercepts the request, and classifies 512 the request to determine whether it is for a cached or non-cached page. Such determination can be made, for example, by determining whether an applicable template page or other cached content has been previously stored, and has not yet expired. In this case, accelerator proxy 106 determines it is a non-cached page. Accelerator proxy 106 requests 513 the page from server 110, and receives HTML response 514 containing HTML code for the requested page. Accelerator proxy 106 captures 515 the response for analysis, and also relays HTML response 514 to browser 112 so that browser 112 can present the requested content to user 307.

Accelerator proxy 106 initiates 516 evaluation of the classified capture(s). In at least one embodiment, evaluation is performed by XPath expression evaluator 206. Expression evaluator 206 requests 517 and receives 518 an expression from accelerator configuration 205, which specifies which portion(s) of the received response are static. This expression selects the HTML elements that have been identified as dynamic. All of the elements that are not selected by the expression are assumed to be static and thus cacheable. Expression evaluator 206 evaluates 519 the captured responses according to the expression, and composes 520 an HTML template page based on the results of the evaluation. In at least one embodiment, this template includes all of the elements that were not selected by the dynamic content selector query. The dynamic sections are replaced with deferred substitution containers that will call back to the origin server for the dynamic content once the template is rendered on browser 112. This template page, also referred to as a cached content template, is returned to accelerator proxy 106, which stores 522 it in its cache 220.

Request Cached Page

Referring now to FIG. 6A, there is shown a flow diagram depicting a method of servicing a request for a cached page according to one embodiment. In the scenario depicted in FIG. 6A, user 307 causes browser 112 to request a web page for which accelerator proxy 106 has previously stored a template page; this is also referred to as a "warm cache" state. In response to the request, accelerator proxy 106 returns a template page (i.e., a page containing placeholders for deferred dynamic content) to browser 112, while also sending the original request to server 110. In at least one embodiment, both messages are tagged with the same unique transaction identifier prior to transmission. Browser 112 renders the template page, and also requests the dynamic content from accelerator proxy 106. At the same time, accelerator proxy 106 waits for the response from server 110; when the response is received, accelerator proxy 106 invokes expression evaluator 206 to extract the dynamic elements from the origin response using dynamic content selector 221 query.

In at least one embodiment, one or more web services are created to generate the dynamic content; the accelerator proxy 106 calls the web service or web services instead of sending the original request through to server 110. Transaction identifiers are still used to associate portions of the dynamic content with requests to the web service or web services. Such an embodiment relieves server 110 from being required to continue responding to requests for pages in the warm cache state.

The dynamic content, also referred to as transaction data, is packaged and made available to browser 112 by the accelerator proxy 106 using the transaction identifier. When browser 112 with the associated transaction identifier requests the dynamic content, the dynamic content is returned to the browser, where it is used to fill in the placeholder(s) in the template page and render the dynamic portion(s) of the page.

FIG. 6A depicts an overview of such a method according to one embodiment. End user 307 navigates 601 to a page for which cached data is available. A process fork takes place. Accelerator proxy 106 returns 603 the cached portion(s) of the page, which includes placeholders for non-cached (dynamic) portion(s). User 307 views 604 the static portion(s) of the page (also referred to as the accelerated portion(s)). In one embodiment, those areas that will contain dynamic content are grayed out or blank until the dynamic content is received.

Concurrently with the display of static content to user 307, accelerator proxy 106 requests content from server 110; this may be a request for the entire web page, or merely the dynamic portion(s). In at least one embodiment, server 110 generates 503 the HTML content including both static and dynamic portions; alternatively, server 110 can generate only the dynamic portion(s). Once accelerator proxy 106 receives a response containing the content from server 110, accelerator proxy 106 captures, grooms, and caches the dynamic content from the response. The dynamic content can be stored at cache 220 associated with accelerator proxy 106. Cache 220 is now ready 506. (In an alternative embodiment, the dynamic content can be provided to browser 112 immediately for storage at browser cache 111.)

Browser 112 request 605 the dynamic content. In at least one embodiment, browser 112 sends this request to accelerator proxy 106; alternatively, the request can be addressed to server 110 but intercepted by accelerator proxy 106. In response to the request, accelerator proxy 106 serves the dynamic content that it recently stored in cache 220. Browser 112 integrates the received dynamic content with the template page that contains static portion(s), allowing end user 307 to view 607 the complete page, including dynamic content. In at least one embodiment, this is performed by populating blank areas of the currently displayed template page using the received dynamic content.

Referring now to FIG. 6B, there is shown a sequence diagram depicting, in more detail, a method of servicing a request for a cached page according to one embodiment. Browser 112 issues request 511 for a web page. Accelerator proxy 106 intercepts the request, and classifies 512 the request to determine whether it is for a cached or non-cached page. Again, such determination can be made, for example, by determining whether an applicable template page or other cached content has been previously stored, and has not yet expired. In this case, accelerator proxy 106 determines it is a cached page. Accelerator proxy 106 adds 611 a transaction tag to the request, so that the static and dynamic portions of the page can later be re-integrated with one another.

Accelerator proxy 106 returns 612 template page, which contains the cached (static) portion(s) of the requested page. In at least one embodiment, this template page includes placeholders for non-cached (dynamic) portion(s). The template page, including static content, is rendered 613 at browser 112.

While the template page including static portion(s) of the web page is presented at browser 112, accelerator proxy 106 requests 513 the page from server 110, and receives HTML response 514 containing HTML code for the requested page. As discussed above, this request/response may be for the entire page or for the dynamic portion(s) only. In an embodiment where the response includes more than just the dynamic portion(s), accelerator proxy 106 initiates 614 evaluation of the HTML response, so as to identify dynamic portion(s). In at least one embodiment, evaluation is performed by expression evaluator 206. Expression evaluator 206 requests 517 and receives 518 an expression from accelerator configuration 205, which specifies a dynamic content selector query that is used to determine which portion(s) of the received response are dynamic. Based on the received expression, expression evaluator 206 evaluates 519 the HTML and composes 618 a dynamic HTML fragment representing the dynamic content as it would be personalized for the particular transaction. This dynamic HTML fragment is returned 619 to accelerator proxy 106, which caches it 620.

During the process where accelerator proxy 106 is obtaining and caching the dynamic HTML fragment, browser 112 is displaying the template page including static content. Browser 112 may also request 615 the dynamic HTML fragment; such request is intercepted by accelerator proxy 106. If the dynamic HTML fragment is not yet available, accelerator proxy 106 responds 616 with a message indicating that the fragment is not available. In at least one embodiment, browser 112 waits 617 an interval before issuing another request 615. Any number of such request 615 and "fragment unavailable" responses 616 may take place, until the dynamic HTML fragment is available and stored at cache 220 of accelerator proxy 106. At such time that the dynamic HTML fragment is available and stored at cache 220, accelerator proxy 106 responds to request 615 by providing 619 the dynamic HTML fragment to browser 112. Browser 112 renders 621 the dynamic content contained therein to provide an integrated web page including both static and dynamic content. In at least one embodiment, such rendering 621 includes filling in previously blank areas of the page.

In at least one embodiment, any number of dynamic HTML fragments may be extracted by expression evaluator 206 and stored at cache 220. If multiple dynamic HTML fragments are available, they can be transmitted in a single response 619 to browser 112, or as multiple responses 619 each containing a subset of the dynamic HTML fragments. Browser can render 621 the dynamic content piece by piece, as each dynamic HTML fragment 619 is received, or as a single operation after all dynamic content has been received.

The above-described embodiment uses a polling technique wherein browser 112 issues any number of requests 615 for the dynamic HTML fragment, until the fragment is ready. Browser 112 may wait 617 any suitable interval between such requests. Accelerator proxy 106 responds to each such request, either indicating 616 that the fragment is not yet available, or providing 619 the fragment.

In at least one alternative embodiment, a technique referred to as "long polling" is used, wherein accelerator proxy 106 holds open the request until the dynamic HTML fragment is ready and cached. In such an embodiment, browser 112 does not send repeated requests 615. Rather, a single request 615 is sent, and accelerator proxy 106 responds when the dynamic HTML fragment is ready and cached.

Edge Cached Implementation

In at least one embodiment, the system of the present invention can be implemented in an architecture that uses edge caching. Edge caching is a technique wherein at least some of the static data is stored at a cache associated with an edge accelerator proxy 202 that is logically, topologically, and/or geographically closer to browser 112. In some situations, such an arrangement may yield faster response times.

Referring now to FIG. 6C, there is shown a sequence diagram depicting a method of servicing a request for an edge cached page according to one embodiment. The method is similar to that depicted in FIG. 6B, except that the page request 511 is intercepted by edge accelerator proxy 202, which performs steps 512 and 611 to classify the request and add the transition tag. Template page 612 is provided by edge accelerator proxy 202. Edge accelerator proxy 202 forwards the page request 511 to accelerator proxy 106, which issues request 513 as described in connection with FIG. 6B. The remainder of the method is identical to that described above in connection with FIG. 6B.

EXAMPLES

The following are code examples for illustrating the operation of the system and method of the present invention according to one embodiment. These examples are provided for illustrative purposes only, and are not intended to limit the scope of the claimed invention in any way.

Original HTML

The following text represents a simple HTML document with a dynamic date-time element. On a typical website, all of the text except the content of the DIV tag with the ID of "time_place_holder" are static and do not change when the server responds to a client request. The contents of the "time_place_holder" tag are replaced with the current server date and time for each server response to a client request. The contents of the "time_place_holder" tag represent the "dynamic" portion of the HTML page for the purposes of this example.

```
<html>
  <head>
  </head>
  <body>
    <div id="time_place_holder">Tue May 1 10:18:00 PDT 2012</div>
  </body>
</html>
```

BSI Selector (XPath)

The following text is an XPath query expression that can be used in conjunction with an XHTML parser to select various elements in an HTML document. In this case, the query is used to select the date-time element(s) in the document that change for each server response (i.e., the "dynamic content").

//div[@id='time_place_holder']

BSI Cached Response

The following text is an example of the static HTML response text after it has been groomed for use in cache 220. Of note, there is an empty element where the dynamic date-time normally would appear. Also, the response text includes additional JavaScript code required to make the deferred request back to the accelerator for the dynamic content.

```
200 OK
Date: Tue, 01 May 2012 17:53:29 GMT
Content-Type: text/html;charset=UTF-8
Cache-Control: no-store
Cache-Control: private, max-age=86400
<html>
<head>
</head>
<body>
<div id="3DF7A1C4-B1325DA9"><script type='text/javascript'>
(function( ) {
var xmlHttp;
var jsId = 0;
function dcsDeferScript( htmlData, regex, uidPrefix )
{
var myregexp = new RegExp(regex, "gi");
var match = myregexp.exec(htmlData);
var matches = [ ];
var value;
var idCount = 0;
while (match != null) {
if ( match.length == 6 ) {
if ( match[3] == "src=" ) {
value = match[4];
} else {
value = match[5].replace(/^\s*\x3C!--.*[\r|\n]/,"");
value = new Function( value );
}
matches.push( { toRemove: match[1], uid: uidPrefix+"-"+idCount,
value: value } );
idCount += 1;
}
// try to match again for more script tags
match = myregexp.exec(htmlData);
}
// remove matches that we loaded from the buffer
for ( var idx = 0; idx < matches.length; idx += 1 ) {
htmlData = htmlData.replace(matches[idx].toRemove, "<div
style='display:none' id='"+matches[idx].uid+"'></div>" );
}
return { htmlData: htmlData, scripts: matches };
}
function ProcessRequest( )
{
if ( xmlHttp.readyState == 4 ) {
if ( xmlHttp.status == 200 ) {
var repObj = dcsDeferScript( xmlHttp.responseText,
"(<script [^>].*?((src=)['\"](.*?)['\"].*?)?>([\\s\\S]*?)<\/script>)",
"B1325DA9" );
var divNode = document.getElementById( '3DF7A1C4-B1325DA9' );
var container = document.createElement( 'div' );
var fragment = document.createDocumentFragment( );
container.innerHTML = repObj.htmlData;
while( container.firstChild ) {
fragment.appendChild( container.firstChild );
}
divNode.parentNode.insertBefore( fragment, divNode );
divNode.parentNode.removeChild( divNode );
var idx;
for ( idx = 0; idx < repObj.scripts.length; idx += 1 ) {
var script = repObj.scripts[idx];
_$1D3F.deferScript( script.uid, script.value );
}
} else if ( xmlHttp.status == 404 ) {
document.location.reload(true);
}
}
}
var Url = '?dc100p=3DF7A1C4-B1325DA9';
if (window.XMLHttpRequest) {
xmlHttp = new XMLHttpRequest( )
} else {
if (window.ActiveXObject) {
xmlHttp = new ActiveXObject('Microsoft.XMLHTTP');
}
}
if (xmlHttp) {
xmlHttp.onreadystatechange = ProcessRequest;
xmlHttp.open( 'GET', Url, true );
xmlHttp.send( null );
}
})( )
</script></div>
</body>
</html>
```

BSI Dynamic Content Response (dc100p)

The following text represents the dynamic content returned by accelerator proxy 106 in response to the deferred client request. This content is created by applying the dynamic content selector 221 query to the origin server 110 HTML response. For clarity, only the elements selected by the query are included.

```
200 OK
Cache-Control: private, max-age=86400
Content-Type: text/html
Date: Tue, 01 May 2012 17:53:51 GMT
Server: DynamicCache
<div id="time_place_holder">Tue May 1 10:26:59 PDT 2012</div>
```

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a non-transitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in at least one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google Inc. of Mountain View, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for presenting content in a client/server environment, comprising:
   at a proxy device communicatively coupled to a client and a server via a communications network, performing the steps of:

intercepting a request from the client for a content item; and responsive to a template page being available for the intercepted request:

retrieving the template page from a cache of the proxy device, wherein the template page only contains at least one static content element with a placeholder for at least one dynamic content element of the content item, wherein the placeholder is to be rendered as a visible object at the client, and wherein the at least one dynamic content element is identified in the content item using a regular expression;

transmitting only the retrieved template page to the client for display at the client as an initial response to the request;

transmitting a request to a server for the content item requested in the intercepted request;

receiving a response from the server, the response comprising the at least one dynamic content element;

identifying the at least one dynamic content element within the received response;

packaging the at least one dynamic element in a consumable format;

transmitting the at least one dynamic content element to the client for display at the client in the place of the placeholder on the template page;

wherein transmitting the at least one dynamic content element to the client is performed in response to a request from the client for the at least one dynamic content element;

further comprising, responsive to receiving a request from the client for the at least one dynamic content element prior to the dynamic content element being received from the server, responding to the request from the client with an indication that the at least one dynamic content element is not available.

2. A computer-implemented method for presenting content in a client/server environment, comprising:

at a proxy device communicatively coupled to a client and a server via a communications network, performing the steps of:

intercepting a request from the client for a content item; and responsive to a template page being available for the intercepted request:

retrieving the template page from a cache of the proxy device, wherein the template page only contains at least one static content element with a placeholder for at least one dynamic content element of the content item, wherein the place holder is to be rendered as a visible object at the client, and wherein the at least one dynamic content element is identified in the content item using a regular expression;

transmitting only the retrieved template page to the client for display at the client as an initial response to the request;

transmitting a request to a server for the content item requested in the intercepted request;

receiving a response from the server, the response comprising the at least one dynamic content element;

identifying the at least one dynamic content element within the received response;

packaging the at least one dynamic element in a consumable format;

transmitting the at least one dynamic content element to the client for display at the client in the place of the placeholder on the template page;

wherein transmitting the at least one dynamic content element to the client is performed in response to a request from the client for the at least one dynamic content element;

further comprising, responsive to receiving a request from the client for the at least one dynamic content element prior to the dynamic content element being received from the server:

holding the request open until the dynamic content element is received from the server; and subsequent to receiving the dynamic content element from the server, transmitting the at least one dynamic content element to the client.

* * * * *